United States Patent
Bredael

[11] Patent Number: 5,558,703
[45] Date of Patent: Sep. 24, 1996

[54] BITUMINOUS COMPOSITIONS

[75] Inventor: Pierre Bredael, Brussels, Belgium

[73] Assignee: Fina Research, S.A., Feluy, Belgium

[21] Appl. No.: 152,344

[22] Filed: Nov. 12, 1993

[30] Foreign Application Priority Data

Nov. 12, 1992 [BE] Belgium ................................ 09200978

[51] Int. Cl.⁶ .................................................... C08L 95/00
[52] U.S. Cl. .................................... 106/281.1; 106/273.1; 106/284.01; 106/DIG. 7; 524/59
[58] Field of Search ........................ 106/277, 281.1, 106/284.01, DIG. 7, 273.1; 524/59

[56] References Cited

U.S. PATENT DOCUMENTS

| | | | |
|---|---|---|---|
| 1,565,258 | 12/1925 | Cobb | 106/284.01 |
| 3,206,319 | 9/1965 | Minnick et al. | 106/284.01 |
| 3,824,109 | 7/1974 | Richards | 106/284.01 |
| 3,986,889 | 10/1976 | Muntzer et al. | 106/284.01 |

FOREIGN PATENT DOCUMENTS 408318  11/1970  Australia ........................... 106/284.01

*Primary Examiner*—Mark L. Bell
*Assistant Examiner*—Michael Marcheschi
*Attorney, Agent, or Firm*—Michael J. Caddell; M. Norwood Cheairs

[57] ABSTRACT

Bituminous compositions are provided by mixing 100 parts of an inorganic skeleton or an aggregate with up to 7 parts of bitumen with a first modifier chosen from the group comprising styrene-butadiene polymers, styrene-isoprene polymers, recycled tires or any mixtures thereof, and a second modifier selected from the group comprising polyolefins, polyethylene terephthalate or any mixtures thereof. The present composition allows the utilization of large amounts of recycled plastics.

8 Claims, No Drawings

BITUMINOUS COMPOSITIONS

BACKGROUND OF THE INVENTION

1. Field Of the Invention

The present invention relates to asphaltic compositions for the preparation of bituminous draining or porous mixes and the preparation thereof.

2. Background

Conventional bituminous mixes are generally applied on most roads. However, the stresses to which these roads are subjected increase from year to year. Increasingly high axle loads and tire rolling pressures and the incessant increase in traffic have an unavoidable effect on the lifetime of these roads. More and more use is made of polymer-modified bitumens and of the development of new bituminous mix structures in order to combat the detrimental effects exerted by these traffic stresses.

The main technical objectives aimed at in the use of modified bitumens are:

(a) a greater resistance to permanent deformation;

(b) an improved low-temperature fatigue resistance; and (c) an increase in the adhesive and cohesive properties.

For many years attempts have been made in highway engineering to employ industrial byproducts and, among these, recovered plastics originating either directly from the industry or from household waste. Plastics are of particular interest both from the viewpoint of cost and from an ecological viewpoint. In fact, this application enables the plastic waste to be permanently removed and does not present the risks related to the possible presence of polluting agents in gas emissions during incineration.

In addition to elastomeric modifiers such as SBS (styrene-butadiene-styrene) block copolymers or SBR (styrene-butadiene rubber) type or EVA (ethylene-vinyl acetate) plastomers, recent attempts have been made to utilize waste from cable manufacture, consisting essentially of LDPE (low density polyethylene) mixed with PVC (polyvinyl chloride) and polystyrene, or mixtures of polymers in household goods. European patent application number EP-332245-A, filed by Enichem having (i) the title "Bituminous Composition for Road Surfacing, (ii) a filing date of Feb. 24, 1989 and (iii) a publication date of Sep. 13, 1989 relates to this general area.

Bituminous draining mixes or porous asphalts have been the object of much interest. They are currently the preferred surfacing compositions for freeways and roads carrying heavy traffic. Their advantages are well known and include the following:

(a) Increased safety for the users: (i) elimination of the film of water on the highway preserves the ;adhesion of the tires to the ground, and this ensures a good trajectory and efficient vehicle braking; (ii) the driver is no longer dazzled by the multiple reflections of the many sources of light; and (iii) water spraying is eliminated.

(b) Reduction in noise: better environmental protection is obtained by virtue of an increase in the sound-absorption properties, in order to lower the perceived noise level.

(c) Reduction in costs: increased service life of the profiling and foundation layers by virtue of optimum water removal by the surface draining layer.

The manufacture of bituminous draining mixes calls for much care. The components forming part of the composition must have specific properties. The properties are obtained by the creation of channels within the thickness of the asphalt, and therefore by increasing the void volume. As a result of the open structure of the surface layer, the binder is subjected to stresses which differ from those encountered with traditional bituminous surface layers. The traditional compositions cannot therefore be employed. In order to combat these effects efficiently and therefore to ensure the durability of the draining layers it is necessary to have a sufficiently thick film of binder around each chip as well as good binder/granulate adhesiveness. Mechanical cohesion of the bituminous mix is traditionally obtained by the addition of new (SBS) or recycled (ground tire) elastomers, the aim being to obtain a binder which is extremely viscous and elastic at the service temperatures. Bituminous compositions in which the polyolefin concentration is higher than 5% by weight of bitumen give binders which are unstable in storage, greatly hardened and exhibiting phenomena of shrinkage on cooling.

SUMMARY OF THE INVENTION

The aim of the present invention is to provide an asphalt-based composition exhibiting the above-mentioned characteristics and permitting the massive use of recycled plastics such as HDPE (high density polyethylene).

The compositions of the present invention comprise essentially:

(a) an inorganic skeleton or aggregate comprising (by weight): from 79 to 88 parts of macadam of 6/17 particle size (between 6 and 17 mm), from 9 to 15 parts of sand of 0.08/2 particle size, from 3 to 8 parts of inert filling material of particle size smaller than 0.08, calculated to obtain a total of 100 parts;

(b) from 3.5 to 7 parts by weight of bitumen which has a penetration of between 65 and 150 tenths of mm at 25° C.;

(c) a first modifier chosen from the group comprising styrene-butadiene or styrene-isoprene copolymers or a mixture of such copolymers or of recycled tires, in a quantity corresponding to 2 to 7% by weight, calculated on the mass of the bitumen, optionally extended with 0 to 3% by weight of oil, calculated on the mass of the bitumen; and (d) a second modifier chosen from the group comprising polyolefins, polyethylene terephthalate or a mixture of such polymers, in a quantity corresponding to 0.5 to 5 parts by weight:, without exceeding the quantity of bitumen.

Another object of the present invention is the use of these compositions for the manufacture of bituminous draining mixes or porous asphalts.

The invention further relates to a process for the preparation of bituminous draining mixes, this process being characterized in that the following are introduced into a mixer, at temperatures of between 130° and 185° C., preferably approximately 140° C. in industrial application and approximately 180° C. on the laboratory scale:

(a) an inorganic skeleton or aggregate comprising:
from 79 to 88 parts of macadam of 6/17 particle size,
from 9 to 15 parts of sand of 0.08/2 particle size, and
from 3 to 8 parts of inert filling material of particle size smaller than 0.08;

(b) either
(I) the combination of (i) bitumen which has a penetration of between 65 and 150 tenths of mm at 25° C., in a quantity corresponding to 3.5 to 7 parts by weight, and (ii) a first modifier chosen from styrene-butadiene copolymers, styrene-isoprene copolymers, recycled tires and mixtures thereof, in a quantity corresponding to 2 to 7% by weight, calculated on the mass of the bitumen, optionally extended with 0 to 3% by weight of oil, calculated on the mass of the bitumen; or (II) 3.57 to 7.7% by weight, calculated on the inorganic mass, of a homogeneous modified bitumen-copolymer binder (styrene-butadiene or styrene-isoprene or a mixture of such copolymers), prepared in a vessel at 150°–180° C. from the components described under (i) and (ii); and (c) a second modifier chosen from the group comprising polyolefins, polyethylene terephthalate and mixtures of such polymers, in a quantity corresponding to 0.5 to 5 parts, calculated on the inorganic mass.

The invention also relates to the use of rolling surfaces which have water draining properties, characterized by the composition described above.

DESCRIPTION OF THE PREFERRED EMBODIMENTS

The particle size, as employed here, should be understood as meaning that 80%, and preferably 90%, of the material must have a particle size larger than the lower value and 80%, and preferably 90%, a particle size smaller than the upper value.

In a preferred embodiment, the invention is characterized in that it consists of a mixture of approximately:

(a) 100 parts of inorganic skeleton, (b) 5.1 pars of bitumen, (c) 0.2 parts of SBS (d) 2 parts of HDPE, preferably recycled.

In a preferred composition, the inorganic skeleton comprises 100 parts of:

(a) from 81 to 85 parts of macadam of 7/14 particle size;

(b) from 11 to 13 parts of sand of 0.08/2 particle size; and (c) from 4 to 6 parts of filling material of particle size smaller than 0.08.

The inorganic skeleton is characterized by a gap grading and must have a composition and a particle size to provide an in-situ void content of between 15 and 30%, preferably between 15 and 25%.

The macadam must have a high hardness and a high resistance to polishing. The macadam which is employed for the production of such surfacings preferably corresponds to the following conditions:

accelerated polishing coefficient on the 7/14 fraction >45% (NBN standard B11-204)

micro Deval coefficient on the 10/15 category <10 (AFNOR NF standard P18-572 October 1978)

Los Angeles coefficient on the 10/14 category <15 (AFNOR NF standard P18573 October 1978).

Examples of useful macadam include flint, porphyry, quartzite and hard sandstone.

The filling material may be chosen from inert matter fines with a particle size smaller than 0.08, such as, for example, cement, secondary crushing fines, fly ash, clay dust or the like.

The bitumens are present in a proportion of 3.5 to 7 parts. The bitumens which can be employed for the production of such surfacings are bitumens for highway use, preferably distillation bitumens or reconstituted bitumens which have penetration values of between 65 and 150 dmm (according to ASTM standard D-5 or IP standard 49) and Ring and Ball values of between 40° and 59° C. (ASTM D-36 or IP 58). These bitumens may optionally be acidified and/or treated by the addition of antioxidants. The preferred bitumen grades have penetrations of between 80 and 100 dmm (dmm=0.1 mm).

The composition additionally comprises from 2 to 7% by weight of a butadiene-styrene elastomer, relative to the bitumen (preferably 4 to 7% by weight). Particularly suitable copolymers include copolymers of the linear or radial SBR or SBS type. Styrene isoprene copolymers may aim be employed, for example SIS (styrene-isoprenestyrene block copolymers). These elastomers can be employed in new or recycled form, by themselves or mixed, extended with 0 to 3% of oil (oil introduced during the preparation of the SBS or oil incorporated during lube use of the recycled SBS in the form of fine rubber powder).

Finally, the composition comprises from 0.5 to 5 parts by weight, preferably 0.5 to 3, relative to the inorganic skeleton or aggregate, of a polyolefin or of polyethylene terephthalate, alone or mixed, new or recycled. The polyolefin is preferably chosen from the products resulting from the polymerization or copolymerization of ethylene or propylene, for example polyethylene (high or low density), polypropylene or ethylene-propylene-diene copolymers (EPDM copolymers). More particularly, when HDPE is employed, the quantities will be preferably limited to 0.5 to 3 parts by weight relative to the inorganic skeleton. The invention also makes it possible to recycle the dry packaging (plastic containers) after grinding. Packages soiled with aqueous or oily solutions (up to 30% by weight of the package) can also be employed, without preliminary washing. The preferred recycled product is in the form of shredded pieces of HDPE.

In general, a bituminous draining mix or porous asphalt can be prepared using two different methods, the first comprising (1) mixing the macadam with premodified binders. This type of preparation poses the problem of homogeneity of the binder, which must be freshly prepared and continuously stirred to avoid separation, and does not allow the incorporation of large quantities of polyolefins. The second method (2) comprises the extemporaneous preparation of the composition for draining bituminous mixes; this type of preparation, which forms the subject of the invention, has the advantage of avoiding the problems of separation in storage and allows large quantities of polyolefins to be incorporated, provided that the second modifier is premetered. The order of addition of the various components of the composition is not important.

The composition according to the invention has in particular the following advantageous properties:

(a) increased Marshall stability; and (b) certain ecological impact: recycling of a large quantity of polyolefins.

The direct addition of HDPE to the asphalt makes it possible to recycle up to 3% HDPE relative to the mass of the asphalt, which represents 20 times the maximum quantity employable via the modified bitumen.

The following examples are given by way of illustration of the present invention and do not imply any limitation in their nature. The Marshall test (ASTM-D-1559-82) characterizes the properties of mechanical strength (stability) and plastic resistance (creep) but does not make it possible to measure validly all the mechanical properties of the draining asphalt, Only the stability measurements are significantly comparable.

EXAMPLES

All the experiments were conducted under the same operating conditions. The inorganic aggregates were screened on appropriate screens in order to obtain the necessary sizes and to remove adherent fine particles (wet screening). The inorganic aggregates were dried in the oven at 105°–110° C., according to size, to constant mass. Individually, starting with the filling material, the necessary quantities of materials (in increasing nominal sizes) were weighed cumulatively with an accuracy of 0.5 g. The aggregate was then mixed and heated in an oven to a temperature of 185° C. The quantity of binder or bitumen employed (2 kg) was heated to 180° C. and introduced with an accuracy of 0.1 g into the blending container preheated to the blending temperature (170° C.). The cold HDPE and the hot aggregate were then added. The material was mixed completely as rapidly as possible (maximum 135 seconds) to obtain a mix in which the bitumen was uniformly distributed.

Example 1

The bituminous mix tested corresponds to the following composition:
(1) inorganic skeleton (corresponding to the conditions described above)
   7/14 Bande secondary crushed product: 82 parts,
   0/2 Bande secondary crushed product: 14 parts (including 1 part of fines),
   type I Ankersmit fines: 4 parts,
(2) 5.1 parts by weight of 81)/100 bitumen
(3) 0.2 parts by weight of Finaprène 401 powder (styrene-butadiene-styrene copolymer; 22% styrene), and
(4) as the second modifying agent: 1 part by weight of dry HDPE.

Example 2

The composition is identical with Example 1 in the case of the inorganic skeleton, the bitumen and the first modifying agent, but with the addition of 2 parts by weight of dry HDPE.

Example 3

The composition is identical with Example 1 in the case of the inorganic skeleton, the bitumen and the first modifying agent, but with the addition of 1 part by weight of oily HDPE (oil content: 26.1% relative to the HDPE).

Example 4

The composition is identical with Example 3 in the case of the inorganic skeleton, the bitumen and the first modifying agent, but with the addition of 2 parts of oily HDPE.

Comparative Example A

The bituminous mix tested corresponds to the following composition:
(1) inorganic skeleton: identical with Example 1, and
(2) 5.3 parts by weight of 80/100 bitumen. There is no modifying agent.

Comparative Example B

The composition is identical with Example 1 in the case of the inorganic skeleton, the bitumen and the first modifying agent, but without the addition of the second modifying agent.

Comparative Example C

The composition is identical with Example 1 in the case of the inorganic skeleton, the bitumen and the first modifying agent, but with the addition of 03 parts by weight of cellulose as the second modifying agent.

Comparative Example D

The bituminous mix tested corresponds to the following composition:
(1) inorganic skeleton: identical with Example 1, and
(2) 5.3 parts by weight of modified bitumen made up of
   91% of 80/100 bitumen,
   6% of Finaprène (registered mark) 480 (styrene-butadiene-styrene copolymer;
   30% styrene; oil content: 50 parts per 100 parts of rubber) and 3% HDPE.

The quantities and the results are summarized in the table below, in which:
AD: direct addition of the SBS and modifying agent in parallel with the bituminous binder when coating the inorganic skeleton
PM: polymer modified bituminous binder including the modifying agent prepared before the coating of the inorganic skeleton
(*): oil content: 26.1%
401P: Finaprène 401 powder
480: Finaprène 480

The results in Table 1 show that the bituminous mixes obtained according to the invention exhibit better use properties.

TABLE 1

| | Marshall tests on bituminous draining mixes | | | | | |
|---|---|---|---|---|---|---|
| | Process | Binder | First modifying agent | Second modifying agent | Void % | Stability (kN) |
| EX 1 | AD | 80/100 bit. 5.1 part | Finaprène 401P 0.2 part | Dry HDPE 1 part | 21.78 | 6.20 |
| EX 2 | AD | 80/100 bit. 5.1 part | Finaprène 401P 0.2 part | Dry HDPE 2 parts | 20.80 | 8.65 |
| EX 3 | AD | 80/100 bit. 5.1 part | Finaprène 401P 0.2 part | Oily HDPE 1 part (*) | 21.78 | 5.10 |

TABLE 1-continued

Marshall tests on bituminous draining mixes

| | Process | Binder | First modifying agent | Second modifying agent | Void % | Stability (kN) |
|---|---|---|---|---|---|---|
| EX 4 | AD | 80/100 bit. 5.1 part | Finaprene 401P 0.2 part | Oily HDPE 2 parts (*) | 19.60 | 5.55 |
| EX A | PM | 80/100 bit. 5.3 part | — | — | 21.72 | 3.40 |
| EX B | AD | 80/100 bit. 5.1 part | Finaprene 401P 0.2 part | — | 22.22 | 4.80 |
| EX C | AD | 80/100 bit. 5.1 part | Finaprene 401P 0.2 part | Cellulose 0.3 part | 20.55 | 4.50 |
| EX D | PM | Modified bitumen 5.3 part (91% 80/100 bit.; 6% Finaprene 480; 3% HDPE) | — | — | 21.84 | 4.25 |

I claim:

1. A composition comprising:
    (A) 100 parts of an aggregate comprising
        (i) from 79 to 88 parts by weight of macadam having a particle size of between 6 and 17 mm,
        (ii) from 9 to 15 parts by weight of sand having a particle size of between 0.08 and 2 mm, and
        (iii) from 3 to 8 parts by weight of inert filling material having a particle size smaller than 0.08 mm;
    (B) from 3.5 to 7 parts by weight based on the aggregate of bitumen which has a penetration value from 65 to 150 tenths of millimeter at 25° C.;
    (C) from 2 to 7% by weight of the bitumen of a first modifier chosen from the group consisting of styrene-butadiene polymers, styrene-isoprene polymers, recycled tires and mixtures thereof; and
    (D) from 0.5 to 5 parts by weight based on the aggregate of a second modifier chosen from the group consisting of polyolefins, polyethylene terephthalate and mixtures thereof.

2. The compositions according to claim 1, in which the aggregate comprises:
    (i) from 81 to 85 parts of macadam having a particle size of between 7 and 14 mm,
    (ii) from 11 to 13 parts having a particle size of between 0.08 and 2 mm, and
    (iii) from 4 to 6 parts of filling material of particle size smaller than 0.08 mm.

3. The compositions according to claim 1, wherein the bitumen has a penetration value from 80 to 100 tenths of millimeter.

4. The compositions according to claim 1, in which the first modifier is introduced in a quantity corresponding to 4 to 7 weight percent of the bitumen.

5. The compositions according to claim 1, in which the second modifier is introduced in a quantity corresponding to 0.5 to 3 parts by weight based on the aggregate.

6. A process for the preparation of an asphalt composition, comprising introducing into a mixer, at temperatures of between 130° and 185° C.,
    (A) 100 parts of an aggregate comprising
        (i) from 79 to 88 parts by weight of macadam having a particle size of between 6 and 17 mm,
        (ii) from 9 to 15 parts by weight of sand having a particle size of between 0.08 and 2 mm, and
        (iii) from 3 to 8 parts by weight of inert filling material having a particle size smaller than 0.08 mm;
    (B) from 3.5 to 7 parts by weight based on the aggregate of bitumen which has a penetration value from 65 to 150 tenths of millimeter at 25° C.;
    (C) from 2 to 7% by weight of the bitumen of a first modifier chosen from the group consisting of styrene-butadiene polymers, styrene-isoprene polymers, recycled tires and mixtures thereof; and
    (D) from 0.5 to 5 parts by weight based on the aggregate of a second modifier chosen from the group consisting of polyolefins, polyethylene terephthalate and mixtures thereof.

7. The process according to claim 6, in which the components are introduced into the mixer at a temperature of approximately 140° C.

8. A process for the preparation of an asphalt composition, comprising introducing into a mixer, at temperatures of between 130° and 185° C.,
    (A) 100 parts of an aggregate comprising
        (i) from 79 to 88 parts by weight of macadam having a particle size of between 6 and 17 mm,
        (ii) from 9 to 15 parts by weight of sand having a particle size of between 0.08 and 2 mm, and
        (iii) from 3 to 8 parts by weight of inert filling material having a particle size smaller than 0.08 mm;
    (B) a homogeneous modified bitumen-copolymer binder premixed at 150° C. to 180° C., and
    (C) from 0.5 to 5 parts by weight based on the aggregate of a modifier chosen from the group consisting of polyolefins, polyethylene terephthalate and mixtures thereof.

* * * * *